B. T. ADAMS.
Horse-Power Sawing-Machine.
No. 220,561. Patented Oct. 14, 1879.
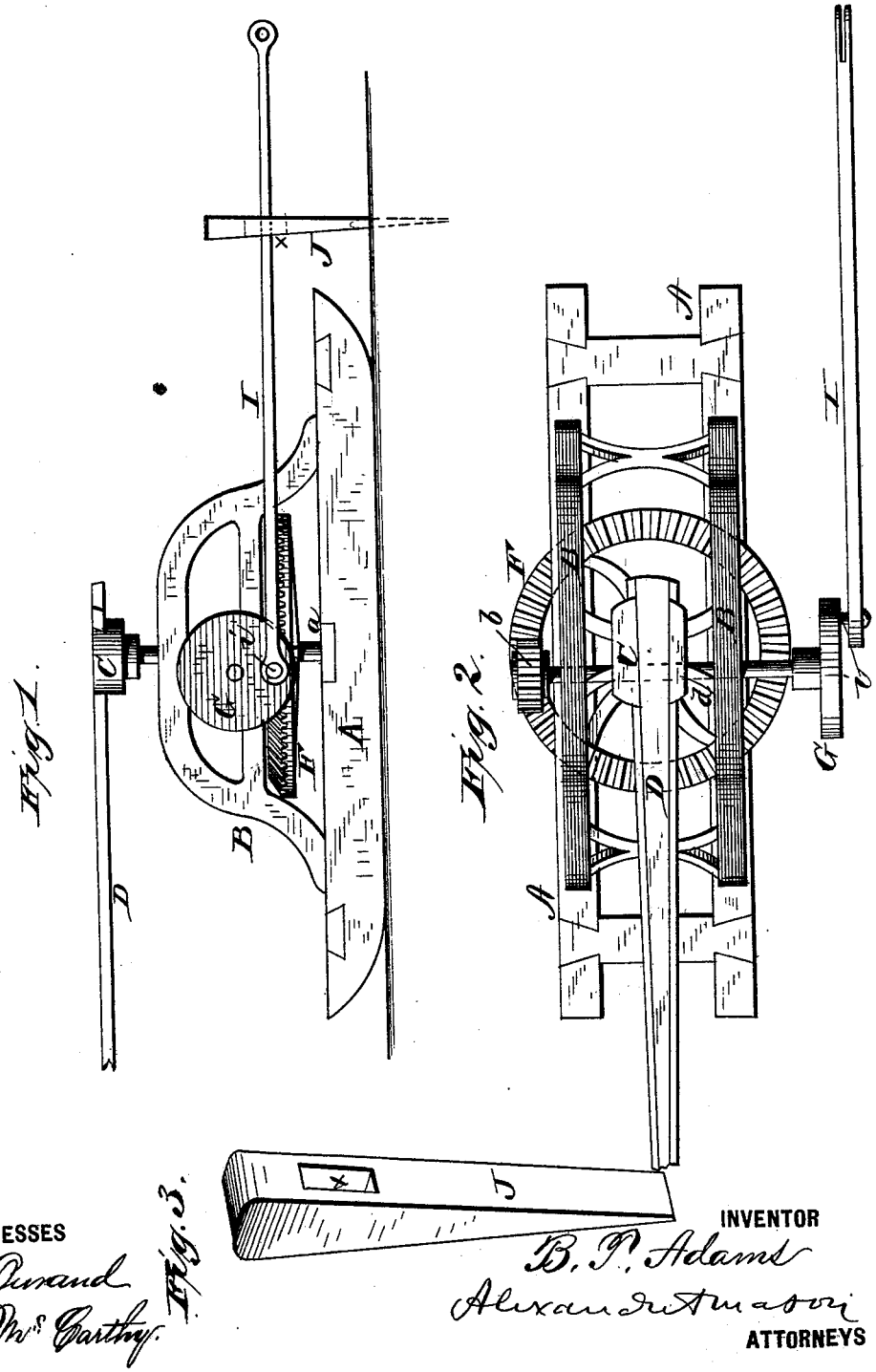

UNITED STATES PATENT OFFICE.

BRICE T. ADAMS, OF AMERICUS, GEORGIA.

IMPROVEMENT IN HORSE-POWER SAWING-MACHINES.

Specification forming part of Letters Patent No. 220,561, dated October 14, 1879; application filed September 9, 1879.

*To all whom it may concern:*

Be it known that I, BRICE T. ADAMS, of Americus, in the county of Sumter, and in the State of Georgia, have invented certain new and useful Improvements in Horse-Power Sawing-Machines; and do hereby declare that the following is a full, clear, and exact description thereof, reference being had to the accompanying drawings, and to the letters of reference marked thereon, making a part of this specification.

The nature of my invention consists in the construction and arrangement of a horse-power for sawing-machines, as will be hereinafter more fully set forth.

In the annexed drawings, Figure 1 is a side elevation, and Fig. 2 a plan view, of my machine.

A A represent two sills, running parallel to each other, and suitably connected by cross-bars to form a rigid bed for the horse-power. On each sill A is a frame, B, and the two frames are also connected by cross bars or ties.

$a$ is the central vertical shaft, provided at its upper end with the head C, having a dove-tailed tapering groove in its top face to receive the correspondingly-shaped sweep D, to which the horse or horses are to be attached.

On the shaft $a$ is secured the large wheel F, which has its rim cogged on the upper face, and meshes with a pinion, $b$, upon a horizontal shaft, $d$, having its bearings in the side frames, B B. Upon the other end of the shaft $d$ is secured a disk or wheel, G, in which is a wrist-pin, $i$, and on this wrist-pin is placed the rod or pitman I.

The saw of the sawing-machine is to be connected to the end of the rod I by a pivot, so as to allow it to accommodate itself to the log. The rod I passes through a slot, $x$, in a wedge, J, which is driven fast into the ground, as shown in Fig. 1.

This horse-power can easily be dragged over the ground from log to log, as required.

Having thus fully described my invention, what I claim as new, and desire to secure by Letters Patent, is—

1. The combination of the connected sills A A with connected side frames, B B, and the gearing, as described, to form a horse-power.

2. The slotted wedge J, in combination with the rod or pitman I and the horse-power, substantially as set forth.

In testimony that I claim the foregoing I have hereunto set my hand this 19th day of August, 1879.

BRICE T. ADAMS.

Witnesses:
H. AUBREY TOULMIN,
A. A. ADAMS.